(12) United States Patent
Foster et al.

(10) Patent No.: US 7,147,697 B2
(45) Date of Patent: Dec. 12, 2006

(54) MAGENTA METAL COMPLEX AZO COMPOUNDS AND INKS AND THEIR USE IN INK-JET PRINTING

(75) Inventors: Clive Edwin Foster, Manchester (GB); John Mayall, Manchester (GB); Mark Kenworthy, Manchester (GB); Rachel Anne James, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 10/559,467

(22) PCT Filed: May 20, 2004

(86) PCT No.: PCT/GB2004/002200

§ 371 (c)(1),
(2), (4) Date: Dec. 5, 2005

(87) PCT Pub. No.: WO2004/108835

PCT Pub. Date: Dec. 16, 2004

(65) Prior Publication Data

US 2006/0137572 A1   Jun. 29, 2006

(30) Foreign Application Priority Data

Jun. 6, 2003   (GB) .................. 0313013.5

(51) Int. Cl.
  *C09D 11/00* (2006.01)
  *C09B 45/00* (2006.01)
(52) U.S. Cl. ............ 106/31.48; 534/653; 534/707
(58) Field of Classification Search .......... 106/31.48; 534/653, 707; 347/100; 428/195.1
   See application file for complete search history.

(56) References Cited

U.S. PATENT DOCUMENTS

| | | | | |
|---|---|---|---|---|
| 3,423,392 A | | 1/1969 | Gerhard et al. ........... 534/653 |
| 4,824,485 A | * | 4/1989 | Tanaka et al. ........... 106/31.48 |
| 5,330,542 A | * | 7/1994 | Maeda et al. .................. 8/639 |
| 5,980,622 A | * | 11/1999 | Byers ...................... 106/31.48 |
| 6,001,161 A | * | 12/1999 | Evans et al. ............. 106/31.48 |
| 6,551,682 B1 | * | 4/2003 | Tosaki et al. ............... 428/64.1 |
| 6,755,903 B1 | * | 6/2004 | Yamada et al. .......... 106/31.45 |
| 6,827,770 B1 | * | 12/2004 | Chino et al. ............. 106/31.46 |
| 6,969,421 B1 | * | 11/2005 | Wright et al. .............. 106/31.5 |
| 6,979,364 B1 | * | 12/2005 | Wright et al. .............. 106/31.5 |
| 7,025,815 B1 | * | 4/2006 | Shimizu et al. .......... 106/31.46 |
| 2003/0125530 A1 | * | 7/2003 | Chino et al. ................ 534/653 |
| 2005/0103225 A1 | * | 5/2005 | Shimizu et al. .......... 106/31.27 |
| 2005/0109237 A1 | * | 5/2005 | Shimizu ................. 106/31.46 |

FOREIGN PATENT DOCUMENTS

| | | |
|---|---|---|
| EP | A-0902064 | 3/1999 |
| EP | A-0995612 | 4/2000 |
| EP | A-1270676 | 1/2003 |

* cited by examiner

*Primary Examiner*—Helene Klemanski
(74) *Attorney, Agent, or Firm*—Morgan Lewis & Bockius LLP

(57) ABSTRACT

A metal chelate compound obtainable from contacting a transition metal salt with a compound of the Formula (1) or a salt thereof:

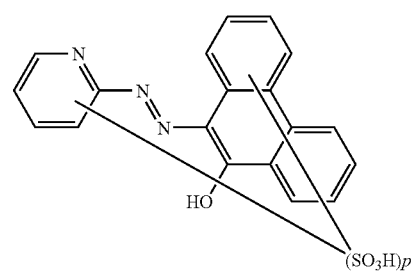

Formula (1)

wherein p is 1 to 2. Also compositions, inks, printed substrates, ink-jet cartridges and ink-jet printers.

12 Claims, No Drawings

MAGENTA METAL COMPLEX AZO COMPOUNDS AND INKS AND THEIR USE IN INK-JET PRINTING

This invention relates to compounds, to inks and to their use in ink-jet printing ("IJP"). IJP is a non-impact printing technique in which droplets of ink are ejected through a fine nozzle onto a substrate without bringing the nozzle into contact with the substrate.

There are many demanding performance requirements for compounds and inks used in IJP. For example they desirably provide sharp, non-feathered images having good water-fastness, light-fastness and optical density. The inks are often required to dry quickly when applied to a substrate to prevent smudging, but they should not form a crust over the tip of an ink-jet nozzle because this will stop the printer from working. The inks should also be stable to storage over time without decomposing or forming a precipitate which could block the fine nozzle.

Colour ink-jet printers typically use four inks of differing hues: magenta, yellow, cyan, and black. Colours other than these may be obtained using differing combinations of these inks. Thus, for optimum print quality, the colourants used must be able to form an ink with a specific precise hue. This can be achieved by mixing colourants but is advantageously achieved by used a single colourant with the exact hue required.

Furthermore, the resultant images desirably do not fade rapidly on exposure to light or oxidising gases such as ozone.

This invention relates to new magenta colorants able to be used in inks and meet the demanding technical requirements of ink-jet printing.

According to a first aspect of the present invention there is provided a metal chelate compound obtainable from contacting a transition metal salt with a compound of the Formula (1) or a salt thereof:

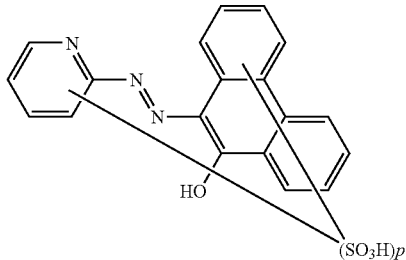

Formula (1)

wherein p is 1 to 2.

Sulfonation of the phenanthrene and/or pyridine ring may be at any susceptible position and in one embodiment p represents a number average reflecting that the metal chelate compound obtainable from a compound of Formula (1) is a mixture mainly comprising mono and di-substituted compounds.

The compounds of Formula (1) provide prints which exhibit a high light-fastness and good optical density when incorporated into inks for ink-jet printing.

The metal chelate compounds obtainable from of Formula (1) may be in the free acid or salt form. Preferred salts are water-soluble, for example alkali metal salts, especially lithium, sodium, potassium, ammonium, substituted ammonium and mixed salts thereof. Preferred alkali metal salts are those with sodium or lithium ammonium and substituted alkyl ammonium salts.

Preferred ammonium and substituted ammonium salts have cations of the formula $^+NV_4$ wherein each V independently is H or optionally substituted alkyl, or two groups represented by V are H or optionally substituted alkyl and the remaining two groups represented by V, together with the N atom to which they are attached, form a 5- or 6-membered ring (preferably a morpholinyl, pyridinyl or piperidinyl ring).

Preferably each V independently is H or $C_{1-4}$-alkyl, more preferably H, $CH_3$ or $CH_3CH_2$, especially H.

Examples of cations include $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

It is especially preferred that the compound is in the form of a sodium, lithium, potassium, ammonium, or substituted ammonium salt because we have found that these salts provide prints which exhibit a high light-fastness when incorporated into an ink-jet printing ink.

The metal chelate compounds may be prepared using techniques analogous to those known for the preparation of metal chelate compounds. For example a suitable method comprises mixing a solution of a transition metal salt and a solution of a compound of Formula (1), preferably in water or an aqueous solution.

Normally 0.5 to 24 hours is sufficient for the transition metal salt to form a metal chelate compound with the compound of Formula (1).

The compounds of Formula (1) may be prepared by, for example, diazotising a 2-amino pyridine-N-oxide to give a diazonium salt and coupling the resultant diazonium salt with a sulphonated or non sulfonated phenanthrene. The N-oxide function is the reduced to give compounds according to the present invention.

The diazotisation is preferably performed at a temperature below 6° C., more preferably at a temperature in the range −10° C. to 5° C. Preferably the diazotisation is performed in water, preferably at a pH below 7. Dilute mineral acid, e.g. HCl or $H_2SO_4$, are often used to achieve the desired acidic conditions.

An alternative preparation of such compounds involves the condensation of a phenanthrenequinone (sulfonated or unsulfonated) and 2-hydrazinopyridine, to give rise to an azophenanthrene, which may be sulfonated using known methods and then metallised.

The product of the above process may be converted to a salt by conventional techniques as hereinbefore described. Alternatively the product may be isolated in its free acid form by acidifying the reaction mixture, preferably using a mineral acid, for example hydrochloric acid and when the product precipitates as a solid it may be separated from the mixture by filtration.

The transition metal salt preferably comprises one or more of the following metals: nickel, chromium, cobalt, copper, zinc, iron or manganese.

Preferably the transition metal salt comprises nickel or copper and more preferably nickel.

The compound of Formula (1) is preferably chelated to the transition metal in the ratio 1:1, 2:1, 2:2 or 2:3 respectively, especially in the ratio 1:1 or 2:1 respectively.

When there is more than one ligand of Formula (1) present in the metal chelate compound then the ligands of Formula (1) may be the same or different but preferably they are the same.

The metal chelate compound obtainable from a compound of Formula (1) may also comprise 1 or more additional ligands. These ligands may be coloured or colourless and when there is more than 1 they may be the same or different.

It is particularly preferred that the transition metal salt is a nickel salt because this results in good chroma properties for the resultant compound. It is also preferred that the transition metal is able to co-ordinate to the portion in square brackets in the ratio 1:1 and 2:1.

Compounds of Formula (1) and the metal chelate compounds obtainable from a compound of Formula (1), as described herein, may exist in tautomeric forms other than those shown in this specification. These tautomers are also included within the scope of the present inventions.

The metal chelate compounds obtainable from compounds of Formula (1) may also exist in different geometries e.g. octahedral or square planar. These different geometric forms are also included in the scope of the present invention.

The present invention also covers mixtures comprising two or more metal chelate compounds obtainable from compounds of Formula (1) or salts thereof. Furthermore, the metal chelate compounds of the may be mixed with other dyes, especially those listed in the International Colour Index, to adjust the shade or other properties as desired.

According to a second aspect of the present invention there is provided a composition comprising (a) one or more metal chelate compound(s) according to the first aspect of the present invention; and (b) a liquid medium.

The liquid medium preferably comprises:
(i) water;
(ii) a mixture of water and an organic solvent; or
(iii) an organic solvent free from water.

The number of parts by weight of component (a) of the ink is preferably from 0.01 to 30, more preferably 0.1 to 20, especially from 0.5 to 15, and more especially from 1 to 5 parts. The number of parts by weight of component (b) is preferably from 99.99 to 70, more preferably from 99.9 to 80, especially from 99.5 to 85, and more especially from 99 to 95 parts. The number of parts (a)+(b) is 100 and all parts mentioned herein are by weight.

Preferably component (a) is completely dissolved in component (b). Preferably component (a) has a solubility in component (b) at 20° C. of at least 5%. This allows the preparation of concentrates which may be used to prepare more dilute inks and reduces the chance of the compound(s) of component (a) of the ink precipitating if evaporation of the liquid medium occurs during storage.

When the liquid medium comprises a mixture of water and an organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and 2 or more, especially from 2 to 8, water-miscible organic solvents.

Especially preferred water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable ink media comprising a mixture of water and one or more organic solvents are described in U.S. Pat. Nos. 4,963,189, 4,703,113, 4,626,284 and EP 4,251,50A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the dye in the liquid medium. Examples of polar solvents include $C_{1-4}$-alcohols. In view of the foregoing preferences it is especially preferred that where the liquid medium is an organic solvent free from water it comprises a ketone (especially methyl ethyl ketone) and/or an alcohol (especially a $C_{1-4}$-alkanol, such as ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Preferably the composition according to the second aspect of the invention is an ink suitable for use in an ink-jet printer.

When the composition according to the second aspect of the invention is an ink-jet ink then both the metal chelate compounds and the ink may be, and preferably are, purified to remove undesirable impurities. Conventional techniques may be employed for purification, for example ultrafiltration, reverse osmosis and/or dialysis.

Ink media comprising an organic solvent free from water are particularly useful where fast drying times are required and particularly when printing onto hydrophobic and non-absorbent substrates, for example plastics, metal and glass.

An especially preferred ink comprises:
(a) from 1 to 10 parts in total of a metal chelate compound as described in the first aspect of the invention;
(b) from 2 to 60, more preferably 5 to 40 parts of water-miscible organic solvent; and
(c) from 30 to 97, more preferably 40 to 85 parts of water;

wherein all parts are by weight.

Preferably the sum of the parts (a)+(b)+(c)=100.

When the liquid medium in the ink comprises a mixture of water and an organic solvent; or an organic solvent free from water, component (a) of the ink may comprise a compound as hereinbefore defined in relation to the first aspect of the invention.

Preferred low melting solid media have a melting point in the range from 60° C. to 125° C. Suitable low melting point solids include long chain fatty acids or alcohols, preferably those with $C_{18-24}$ chains, and sulphonamides. The compound of the first aspect of the present invention may be dissolved in the low melting point solid or may be finely dispersed in it.

The inks according to the present invention may also contain additional components conventionally used in ink-jet printing inks, for example viscosity and surface tension modifiers, corrosion inhibitors, biocides, kogation reducing additives, anti-cockle agents to reduce paper curling and surfactants which may be ionic or non-ionic.

The pH of the ink is preferably from 4 to 11, more preferably from 7 to 10.

The viscosity of the ink at 25° C. is preferably less than 50 cP, more preferably less than 20 cP and especially less than 5 cP.

When the inks according to the invention are used as ink-jet printing inks, the ink preferably has a concentration of less than 500 parts per million, more preferably less than 100 parts per million of halide ions.

It is also preferred that the ink has less than 100, more preferably less than 50 parts per million of divalent and trivalent metals (other than any divalent and trivalent metal ions bound to a compound of Formula (1) or any other component of the ink), wherein parts refer to parts by weight relative to the total weight of the ink.

We have found that purifying the inks to reduce the concentration of these undesirable ions reduces nozzle blockage in ink-jet printing heads, particularly in thermal ink-jet printers.

A third aspect of the present invention provides a process for printing an image on a substrate comprising applying thereto by means of an ink-jet printer an ink as described in the second aspect of the invention.

The ink used in this process is preferably as defined in the second aspect of the present invention.

The ink-jet printer preferably applies the ink to the substrate in the form of droplets which are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO 00/48938 and International Patent Application WO 00/55089.

The substrate is preferably paper, plastic, a textile, metal or glass, more preferably paper, an overhead projector slide or a textile material, especially paper. Preferred papers are plain or treated papers which may have an acid, alkaline or neutral character. Glossy papers are especially preferred. More especially photographic quality paper is preferred Examples of commercially available papers include, HP Premium Coated Paper, HP Photopaper (all available from Hewlett Packard Inc.), Stylus Pro 720 dpi Coated Paper, Epson Photo Quality Glossy Film, Epson Photo Quality Glossy Paper (available from Seiko Epson Corp.), Canon HR 101 High Resolution Paper, Canon GP 201 Glossy Paper, Canon HG 101 High Gloss Film (all available from Canon Inc.), Wiggins Conqueror paper (available from Wiggins Teape Ltd), Xerox Acid Paper and Xerox Alkaline paper (available from Xerox).

A fourth aspect of the present invention provides a substrate, preferably a paper, an overhead projector slide or a textile material, printed with a metal chelate compound according to the first aspect of the invention, printed with a composition or ink according to the second aspect of the invention or printed by means of a process according to the third aspect of the present invention.

According to a fifth aspect of the present invention there is provided an ink-jet printer cartridge comprising a chamber and ink, wherein the ink is present in the chamber and is as described in the second aspect of the present invention.

According to a sixth aspect of the present invention there is provided an ink-jet printer containing an ink-jet printer cartridge, wherein the ink-jet printer cartridge is as defined in the sixth aspect of the present invention The invention is further illustrated by the following Examples in which all parts and percentages are by weight unless otherwise stated.

EXAMPLE 1

Preparation of a Nickel Chelate of a Compound of Formula:

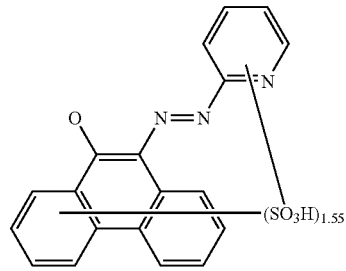

Stage 1(a):

Phenanthrenequinone (2.08 g, 0.01 mol) and 2-hydrazinopyridine (1.09 g, 0.01 mol) were added to stirred glacial acetic acid (25 ml). The mixture was heated to 100° C. for two hours and then allowed to cool to room temperature and filtered. The filtrate was evaporated under reduced pressure to leave a tarry material. This residue was ground under water and the resultant solid was collected by filtration. The product was washed with water and then dried in an oven at 50° C. to give an orange/red solid.

Stage 1(b):

The azophenanthrene prepared in stage (a) (2.99 g, 0.01 mol) was added to an ice-cold stirred solution of 98% sulphuric acid (35 ml). The reaction mixture was heated to 100° C. and stirred for a further 2 hours. The reaction mixture was poured carefully onto ice before increasing the pH to pH8 using concentrated sodium hydroxide, maintaining the temperature with an ice/water bath. The mixture was dialysed to low conductivity, filtered and the sulfonated ligand was obtained from evaporation of the filtrate under reduced pressure. The product was shown to be a mixture of mono and di-sulfonated material, by reverse phase HPLC using a octadecasilyl column and a gradient elution from 0.01 M ammonium acetate solution to a final solution of 90% acetonitrile:10% ammonium acetate. The relative amounts of the di- and tri-sulfonated species was estimated from the peaks corresponding to each species.

Stage 1(c):

A solution of nickel acetate tetrahydrate (1.25 g, 0.005 mol) in water (15 ml) was added dropwise to the product from stage 1(b) (4.59 g, 0.01 mol) dissolved in water (250 ml) at pH7. The reaction mixture was stirred at room temperature and the pH of the solution was raised to pH8 with 2M NaOH before being dialysed to low conductivity. The title compound was obtained by filtering the solution and then evaporating the filtrate under reduced pressure.

Comparative Dye 1

Comparative Dye 1 was prepared as described in Example 4 of EP 1270676A and is of Formula:

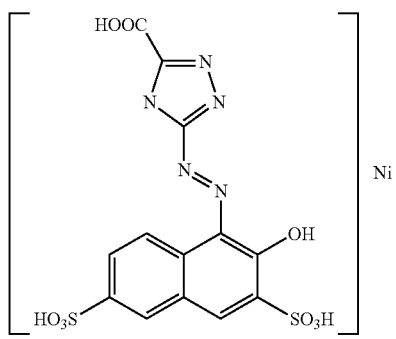

Comparative Dye 2

Comparative Dye 2 was prepared as described for Example IV of EP0902064B and is of Formula:

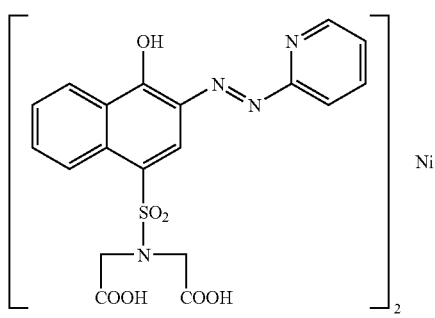

EXAMPLE 2

Inks and Inkjet Printing

The dyes described in Examples 1 and Comparative Dyes 1 and 2 were each converted into the corresponding inks by dissolving 3.5 parts of each in 96.5 parts of a liquid medium comprising:
5 parts 2-pyrrolidone;
5 parts thiodiglycol;
2 parts Surfynol™ 465 (a non-ionic surfactant available from Air Products Inc.);
88 parts water: and
adjusted to pH9.5 with ammonium hydroxide.

The inks so prepared were designated as Ink 1, Comparative Ink 1 and Comparative Ink 2 depending on which dye was incorporated therein Ink-Jet Printing Ink 1 and the Comparative Inks 1 and 2 were filtered through a 0.45 micron nylon filters and then incorporated into empty ink-jet print cartridges using a syringe.

The inks were then printed using an HP560C printer onto both Hewlett-Packard Premium Plus Photo Paper and Canon Professional Photo Paper PR101 at 100% and 70% strength.

These prints were tested for ozone fastness by exposure to 1 ppm ozone at 40° C., 50% relative humidity for 24 hrs in a Hampden 903 Ozone cabinet. The prints were also tested for light fastness by exposure to a Xenon Arc lamp for 100 hours in an Atlas Ci5000 Weatherometer. Fastness of the printed ink to ozone and light was judged by the difference in the reflected optical density (ROD) before and after exposure.

Colour measurements of the prints before and after exposure to ozone and light were performed using a Gretag spectrolino spectrophotometer set to the following parameters:

| | |
|---|---|
| Measuring Geometry | 0°/45° |
| Spectral Range | 400–700 nm |
| Spectral Interval | 20 nm |
| Illuminant | D65 |
| Observer | 2° (UE 1931) |
| Density | ANSI A |
| External Filler | None |

Ozone and light fastness were assessed by the change in the shade of the print as judged via percentage ROD loss of the print, where a lower figure indicates higher fastness. The figures in brackets correspond to the prints at 70% strength. Results are shown in Table 1.

TABLE 1

| | % ROD loss lightfastness | | % ROD loss ozonefastness | |
|---|---|---|---|---|
| | Canon PR101 | HP Premium Plus | Canon PR101 | HP Premium Plus |
| Ink 1 | 12 (14) | 10 (7) | 5 (11) | Not tested |
| Comparative Ink 1 | 34 (39) | 24 (17) | 57 (61) | Not tested |
| Comparative Ink 2 | 37 (45) | 33 (21) | 35 (34) | Not tested |

Table 1 shows that the inks of the present invention have greatly improved ozone fastness and light fastness when compared to similar analogues.

Further Inks

The inks described in Tables A and B may be prepared using as the dye the compound of Example 1. Numbers quoted in the second column onwards refer to the number of parts of the relevant ingredient and all parts are by weight. The inks may be applied to paper by thermal or piezo ink-jet printing.

The following abbreviations are used in Tables A and B:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 10.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | | 4 | | |
| 10.8 | 90 | 5 | | | | | | 5 | | | |
| 10.0 | 80 | 2 | 6 | 2 | 5 | | | 1 | | 4 | |
| 1.8 | 80 | | 5 | | | | | | | 15 | |
| 2.6 | 84 | | | 11 | | | | | | 5 | |
| 3.3 | 80 | 2 | | | 10 | | | | 2 | | 6 |
| 12.0 | 90 | | | 7 | | 0.3 | | 3 | | | |
| 5.4 | 69 | 2 | 20 | 2 | 1 | | | | | 3 | 3 |
| 6.0 | 91 | | | 4 | | | | | | 5 | |

TABLE B

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | 3 | |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | | 10 | | | | | | | |
| 2 | 88 | | | | | | | 10 | | | |
| 5 | 78 | | | 5 | | | 12 | | | 5 | |
| 8 | 70 | 2 | | 8 | | | 15 | | | 5 | |
| 10 | 80 | | | | | | 8 | | 12 | | |
| 10 | 80 | | 10 | | | | | | | | |

The invention claimed is:

1. A metal chelate compound obtainable from contacting a transition metal salt with a compound of the Formula (1) or a salt thereof:

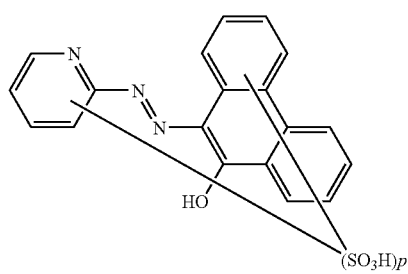

Formula (1)

wherein p is 1 to 2.

2. A metal chelate compound according to claim 1 wherein the transition metal salt is a nickel salt.

3. A metal chelate compound according to claim 1 which is in the form of a sodium, lithium, potassium, ammonium, or substituted ammonium salt.

4. A composition comprising (a) one or more metal chelate compound(s) according to claim 1; and (b) a liquid medium.

5. A composition according to claim 4 which is an ink suitable for use in an ink-jet printer.

6. An ink according to claim 5 which comprises:
   (a) from 1 to 10 parts in total of a metal chelate compound as described in any one of claims 1 to 3;
   (b) from 2 to 60 parts of water-miscible organic solvent; and
   (c) from 30 to 97 parts of water;
wherein all parts are by weight.

7. A process for printing an image on a substrate comprising applying thereto by means of an ink-jet printer an ink as described in claim 4.

8. A substrate printed with a metal chelate compound according to claim 1.

9. An ink-jet printer cartridge comprising a chamber and ink, wherein the ink is present in the chamber and the ink is as described in claim 5.

10. An ink-jet printer containing an ink-jet printer cartridge, wherein the ink-jet printer cartridge is as defined in claim 9.

11. A substrate printed with a composition or ink according to claim 4.

12. A substrate printed with a metal chelate compound by a process according to claim 7.

* * * * *